J. AUTH.
DUMPING WAGON.
APPLICATION FILED JAN. 16, 1912.
1,028,525.
Patented June 4, 1912.
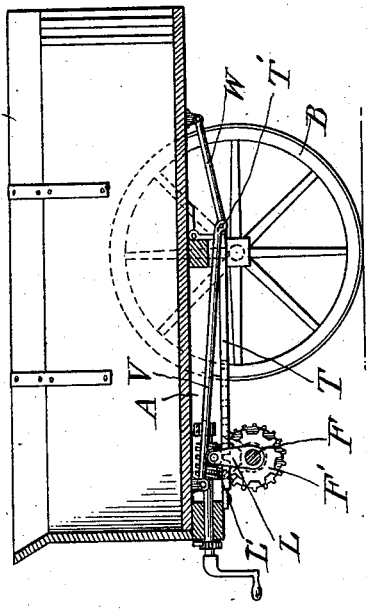
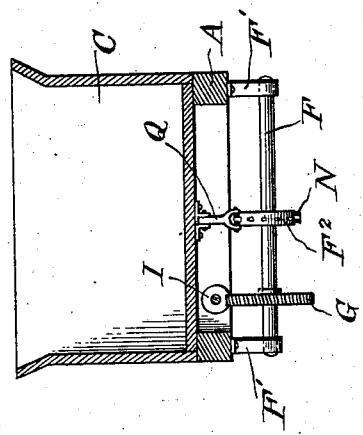
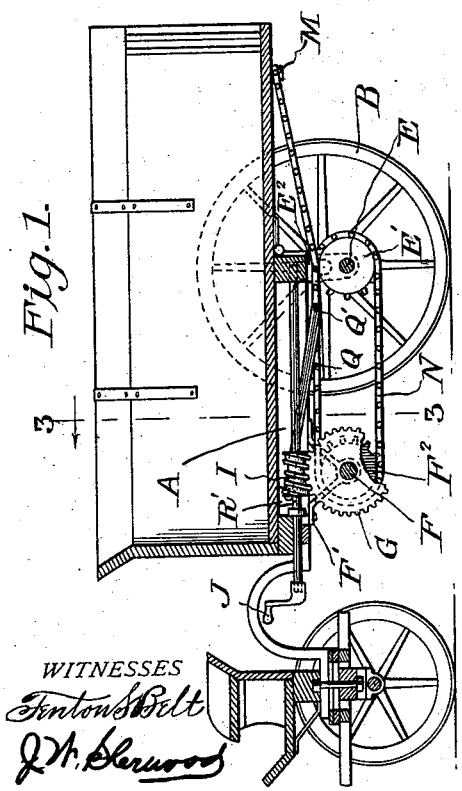
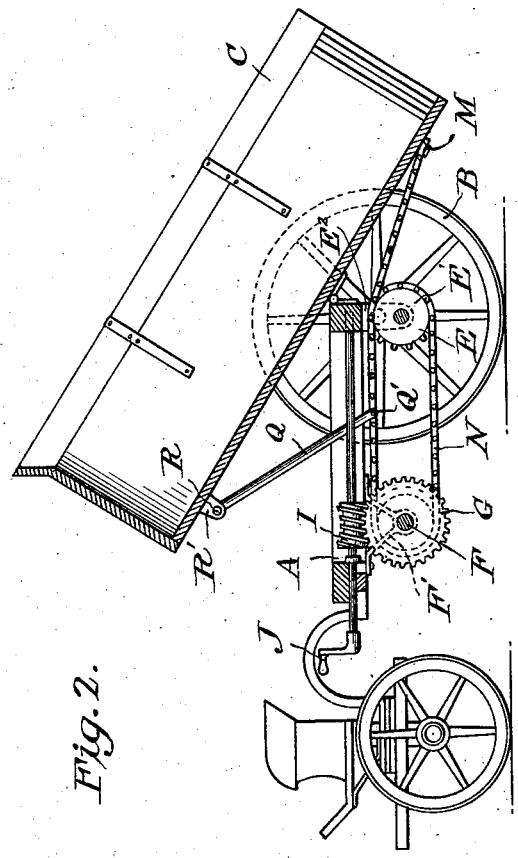
WITNESSES
INVENTOR
J. Auth
Attorney

UNITED STATES PATENT OFFICE.

JOSEPH AUTH, OF COVINGTON, KENTUCKY, ASSIGNOR OF ONE-HALF TO EDWARD LUSHBAUGH, OF COVINGTON, KENTUCKY.

DUMPING-WAGON.

1,028,525.  Specification of Letters Patent.  Patented June 4, 1912.

Application filed January 16, 1912. Serial No. 671,400.

*To all whom it may concern:*

Be it known that I, JOSEPH AUTH, a citizen of the United States, residing at Covington, in the county of Kenton and State of Kentucky, have invented certain new and useful Improvements in Dumping-Wagons; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in dumping wagons and comprises a simple and efficient device of this nature having various details of construction and combinations and arrangements of parts which will be hereinafter fully described, shown in the accompanying drawings and then specifically defined in the appended claim.

I illustrate my invention in the accompanying drawings, in which:—

Figure 1 is a vertical longitudinal section through a dumping wagon made in accordance with my invention. Fig. 2 is a similar view showing the position that the box assumes when dumped. Fig. 3 is a detail cross sectional view, parts being shown in elevation, and Fig. 4 is a detail of a modified form of the means for dumping the wagon.

Reference now being had to the details of the drawings by letter, A designates the truck of a wagon mounted upon the wheels B, and C is a box which is hinged to the truck immediately behind the rear axle. Mounted underneath the rear axle is a shaft E and journaled upon said shaft is a sprocket wheel E', said rear axle being recessed away as at E² to allow the sprocket wheel to turn freely without interference. A second shaft, designated by letter F, is journaled in the bearings F' upon the under side of the truck frame and intermediate the forward and rear wheels, and a sprocket wheel F² is keyed to the shaft F as is also a worm wheel G, which latter is in mesh with a horizontally disposed worm I, journaled in suitable bearings upon the truck frame. Said worm shaft has one end squared in cross section and adapted to receive a crank J whereby said worm shaft may be rotated and, through the medium of the latter, impart motion to the shaft F. A sprocket chain, designated by letter N, passes about the two sprocket wheels and one end of said chain is fastened to an eye M projecting from the bottom of the box. A bar Q is fastened at Q' to one of the links of said chain and its other end is pivotally connected to a pin R carried by the lugs R' which are fastened to the bottom of the box adjacent to its forward end.

In the form shown in Fig. 4, I have dispensed with the chain and also the shaft, which is fastened to the under side of the rear axle, and employ a sprocket bar, designated by letter T, one end of which is pivotally connected to a pin T', to which the bars W and V are also pivotally connected, the upper ends of which bars are fastened to the under surface of the wagon, one shorter and the former being secured adjacent to the rear end of the box, while the latter is secured near the forward end. Said sprocket bar has holes therein for the reception of the teeth of the sprocket wheel F', and bars L are mounted upon the shaft F and have pivotally mounted between their upper ends an anti-friction roller L' adapted to bear against the upper surface of the sprocket bar to hold the same in mesh with said sprocket wheel.

By the provision of a dumping wagon embodying the features of my invention, it will be noted that a loaded wagon may be easily and quickly hoisted to a dumping position with a minimum power through the medium of the sprocket chain and bar with auxiliary bars attached thereto, as shown in the drawings. By reason of the worm gear wheel and shaft meshing with each other, the box may be held at an inclination without the worm shaft rotating.

What I claim to be new is:—

A dumping wagon comprising a truck frame, a wagon box hinged to said frame, a shaft journaled upon hangers underneath the rear axle, a sprocket wheel fixed to said shaft, a second shaft, a sprocket wheel fixed to the latter, a sprocket chain passing about said sprocket wheels, gear mechanism for driving one of said sprocket wheels, said chain having a projecting end fastened to the bottom of the box adjacent to its rear end, a lug projecting from the bottom of the box near its forward end, and a rod pivotally connected at one end to said lug and its other end forked and pivotally connected to a pivotal pin connecting links of said chain, as set forth.

In testimony whereof I hereunto affix my signature in the presence of two witnesses.

JOSEPH AUTH.

Witnesses:
A. L. HOUGH,
FRANKLIN H. HOUGH.